(12) United States Patent
Wilson

(10) Patent No.: US 7,535,463 B2
(45) Date of Patent: May 19, 2009

(54) OPTICAL FLOW-BASED MANIPULATION OF GRAPHICAL OBJECTS

(75) Inventor: Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 622 days.

(21) Appl. No.: 11/154,495

(22) Filed: Jun. 15, 2005

(65) Prior Publication Data

US 2006/0284874 A1    Dec. 21, 2006

(51) Int. Cl.
*G06F 3/042* (2006.01)
(52) U.S. Cl. ...................................... 345/175
(58) Field of Classification Search ......... 345/156–184; 353/122
See application file for complete search history.

(56) References Cited

U.S. PATENT DOCUMENTS

| | | | | |
|---|---|---|---|---|
| 4,992,650 | A | 2/1991 | Somerville | 235/462 |
| 5,982,352 | A * | 11/1999 | Pryor | 345/158 |
| 6,061,177 | A * | 5/2000 | Fujimoto | 345/175 |
| 6,414,672 | B2 * | 7/2002 | Rekimoto et al. | 345/173 |
| 7,084,859 | B1 * | 8/2006 | Pryor | 345/173 |
| 2003/0137494 | A1 * | 7/2003 | Tulbert | 345/173 |
| 2005/0110964 | A1 * | 5/2005 | Bell et al. | 353/122 |
| 2005/0116931 | A1 * | 6/2005 | Olbrich | 345/158 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1, 2-Dimensional Bar Code Page." Available http://www.adams1.com/pub/russadam/stack.html. Printed Jan. 20, 2004. 14 pp.
Ambiente article. "InteracTable®." Dated Jul. 7, 2000. Available http://www.darmstadt.gmd.de/ambiente/activities/interactable.html. Printed Nov. 21, 2003. 3 pp.
Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8 pp.

(Continued)

*Primary Examiner*—Chanh Nguyen
*Assistant Examiner*—Adam J Snyder
(74) *Attorney, Agent, or Firm*—Workman Nydegger

(57) ABSTRACT

Motion of one or more physical objects relative to a display surface of a display system is detected and an optical flow determined from the motion is used to manipulate a graphical object presented on the display surface. The one or more physical objects are detected in response to light reflected from the object(s) and received by a video camera. The optical flow is determined from the video camera image by identifying flow vectors for points in one or more patches included in the image that correspond to the physical objects. A proximity of a physical object to the display surface can be determined based on an intensity of light reflected from the physical object(s), or using a touch sensor such as a capacitance, pressure, or electromagnetic sensor or the like. Based on the optical flow, the graphical object can be translated, rotated, and/or scaled in size.

16 Claims, 7 Drawing Sheets

OTHER PUBLICATIONS

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5 pp.

Dietz and Leigh. "DiamondTouch: A Multi-User Touch Technology." UIST '01 Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2 pp. total (3 pp printed).

Fukuchi and Rekimoto. "Interaction Techniques for SmartSkin." ACM UIST2002 demonstration, 2002. 2 pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8 pp.

Grant and Winograd. "Flexible, Collaborative Organization on a Tabletop." ACM CSCW 2002: Workshop on Co-located Tabletop Collaboration: Technologies and Directions. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6 pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2 pp search results, 21 pp article.

"IR Distance Sensor." Available http://www.diyelectronics.com/Accessories/TRDS.html (2 pp) and http://www.diyelectronics.com/Accessories/GP2D05.html (1pg). Printed Dec. 30, 2003. 3 pp.

Ishii and Ullmer. "Tangible Bits: Towards Seamless Interfaces between People, Bits and Atoms." Proceedings of CHI '97, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." Proceeding of CHI '99, May 15-20, 1999, © 1999 ACM. pp. 1-8.

Johanson, Kolodny, Russell. "A Hand pose and Position Tracker for the Interactive Table." CS223B Final Project. Available http://graphics.stanford.edu/~drussel/vision/tracker-report.html. Printed Dec. 16, 2003, 6 pp.

Ju, Hurwitz, Judd, and Lee. "CounterActive: An Interactive Cookbook for the Kitchen Counter." Extended Abstracts of CHI 2001, Seattle. Apr. 2001. pp. 269-270.

Kang, Sing Bing. "Radial Distortion Snakes." IAPR Workshop on Machine Vision Applications (MVA2000), Tokyo, Japan. Nov. 2000. pp. 603-606.

Kato, Billinghurst, Poupyrev, Imamoto, and Tachibana. "Virtual Object Manipulation on a Table-Top AR Environment" IEEE and ACM Int'l Symposium on Augmented Reality 2000, ISAR'2000, Oct. 5-6, 2000, Munich. 9 pp.

Klemmer, Newman, Sapien. "The Designer's Outpost: A Task-Centered Tangible Interface for Web Site Information Design." Proceedings of Human Factors in Computing Systems: CHI 2000 Extended Abstracts. The Hague, The Netherland. Apr. 1-6, 2000. pp. 333-334.

Klemmer, Newman, Farrell, Bilezikjian, and Landay. "The Designers' Outpost: A Tangible Interface for Collaborative Web Site Design." CHI Letters, The 14th Annual ACM Symposium on User Interface Soft Technology: UIST 2001. 3(2). pp. 1-10.

Kobayashi, Hirano, Narita, and Ishii. "A Tangible Interface for IP Network Simulation." CHI 2003, Apr. 5-10, 2003, Ft. Lauderdale, FL ACM 1-58113-630-7/03/0004. 2 pp.

Koike, Sato, and Kobayashi. "Integrating Paper and Digital Information on EnchancedDesk: A Method for Realtime Finger Tracking on an Augmented Desk System." ACM Transaction on Computer-Human Interaction, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." Proceedings of the IEEE Virtual Reality 2000 Conference, Mar. 18-22, 2000. New Brunswick, New Jersey: IEEE Computer Society, 2000. 8 pp.

Magerkurth, Stenzel, and Prante. "STARS—A Ubiquitous Computing Platform for Computer Augmented Tabletop Games." 5th International Conference on Ubiquitous Computing (Ubicomp '03), Oct. 12-15, 2003, Seattle, Washington. 2 pp.

Malandain, Grégoire. "Connected Components Extraction." Available http://www-sop.inria.fr/epidaure/personnel/malandain/segment/connexe.html. Printed Dec. 18, 2003. 3 pp.

Matsushita and Rekimoto. "HoloWall: Designing a Finger, Hand, Body, and Object Sensitive Wall." UIST '97 Banff, Alberta, Canada. © 1997 ACM 0-89791-881-9/10/97. pp. 209-210.

Moran, Saund, van Melle, Gujar, Fishkin, and Harrison. "Design and Technology for Collaborage; Collaborative Collages of Information on Physical Walls." UIST '99. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." Proceedings of UIST 2002, Oct. 27-30, 2002. © 2002 ACM. 10pp.

Paradiso, Hsiao, Strickon, Lifton, and Adler. "Sensor systems for interactive surfaces." IBM Systems Journal, vol. 39, Nos. 3&4, 2000. pp. 892-914.

Patten, Ishii, Hines, and Pangaro. "Sensetable: A Wireless Object Tracking Platform for Tangible User Interfaces." Proceedings of CHI 2001, Mar. 31-Apr. 5, 2001, ACM Press, © 2001 ACM. 8 pp.

Patten, Recht, and Ishii. "Audiopad: A Tag-based Interface for Musical Performance." Proceedings of Conference on New Interface for Musical Expression (NIME '02). Dublin, Ireland, May 24-26, 2002. 6 pp.

Ramos and Balakrishnan. "Fluid Interaction Techniques for the Control and Annotation of Digital Video." UIST '03 Vancouver, B.C., Canada. © 2003 ACM 1-58113-636-06/03/0010. pp. 105-114.

Rekimoto and Ayatsuka. "CyberCode: Designing Augmented Reality Environments with Visual Tags." Proc. of UIST 2000, 2000. 10pp.

Rekimoto and Matsushita. "Perceptual Surfaces: Towards a Human and Object Sensitive Interactive Display." Proceedings of Workshop on Perceptual User Interactes (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Continuous Work Space for Hybrid Computing Environments." CHI '99, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." Proc. of Asia Pacific Computer Human Interaction (APCHI '98), 1998. 6pp.

Rekimoto, Jun. "Multiple-Computer User Interfaces: 'Beyond the Desktop' Direct Manipulation Environments" ACI CHI2000 Video Proceedings, 2000. 2pp.

Rekimoto, Jun. "Pick-and-Drop: A Direct Manipulation Technique for Multiple Computer Environments." Proceedings of UIST '97, 1997. pp. 31-39.

Rekimoto, Jun. "SmartSkin: An Infrastructure for Freehand Manipulation on Interactive Surfaces." CHI 2002, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." SIGCHI'01, Mar. 31-Apr. 4, 2001, Seattle, WA. © 2001 ACM 1-58113-327-8/01/0003. 8pp.

Reznik, Canny, and Alldrin. "Leaving on a Plane Jet." 2001 Int. Conf. on Intell. Robots & Systems (IROS), Maui, Hawaii, Oct. 2001. 6pp.

Ringel, Gerh, Jin, and Winograd. "Barehands: Implement-Free Interaction with a Wall-Mounted Display." Short Talks. CHI 2001 Mar. 31 - Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews*, TablePCHome.com—Table PC user community. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-02/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geiβler, Holmer, Konomi, Müller-Tomfelde, Reischl, Rexrogh, Seitz, and Steinmetz. "i-Land: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDesk: Models and Prototypes for Tangible User Interfaces." *Proceedings of UIST'97*, Oct. 14-17, 1997. © 1997 ACM—ACM 0-89791-881-9/10/97. 10 pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-Word Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Northrop Grumman "TouchTable™" Brochure © 2005 Northrop Grumman Space & Mission Systems Corp. RS1190705. 2 pp.

* cited by examiner

OPTICAL FLOW-BASED MANIPULATION OF GRAPHICAL OBJECTS

BACKGROUND

Several interactive display systems are currently known. For example, a user interface platform was developed in the MIT Media Lab, as reported by Brygg Ullmer and Hiroshi Ishii in "The metaDESK: Models and Prototypes for Tangible User Interfaces," *Proceedings of UIST* 10/1997:14-17. This article describes how the metaDESK includes a near-horizontal graphical surface that is used to display two-dimensional (2D) geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface to provide images that are visible to a user from above the graphical display surface. The article further teaches that the IR camera can detect passive objects called "phicons" that are placed on the graphical surface. Thus, when the IR camera detects the pattern applied to the undersurface of a "Great Dome phicon," it responds by displaying a map of the MIT campus on the graphical surface, with the actual location of the Great Dome in the map positioned where the Great Dome phicon is located.

Moving the Great Dome phicon over the graphical surface manipulates the displayed map by rotating or translating the map in correspondence to the movement of the phicon by a user. Clearly, the IR vision-sensing system used in this prior art interactive display is able to detect objects like the phicon, based upon the pattern applied to it. There is no discussion of details involved in simply detecting an object without a pattern, or in determining a relative position of an object above the display surface.

A similar technique for sensing objects on a display surface is disclosed in several papers published by Jun Rekimoto of Sony Computer Science Laboratory, Inc., in collaboration with others. These papers briefly describe a "HoloWall" and a "HoloTable," both of which use IR light to detect objects that are proximate to or in contact with a display panel on which a rear-projected image is visible. The rear-projection panel, which is vertical in the HoloWall and horizontal in the HoloTable, is semi-opaque and diffusive, so that objects reflecting IR light back through the panel become more clearly visible to an IR camera as they approach and then contact the panel. The objects thus detected can be a user's fingers or hand, or other objects. Again, these papers are generally silent regarding the process used for detecting an object based upon the IR light reflected from the object and also fail to discuss determining the relative separation between an object and the display surface.

Interaction between graphical objects on an interactive display surface and a three-dimensional object has generally been limited to treating each three-dimensional object as a discrete point. Part of the goal of this type of interface is to maintain a style of "direct manipulation" when manipulating virtual objects that is very similar to that experienced when manipulating real physical objects. A user's prior experience with manipulating real physical objects should thus inform the user's interaction with the corresponding virtualized objects. In the spirit of direct manipulation, the best interface is one which simulates as closely as possible the real physical movement of objects. For example, a user might initiate rotation of an object such an image of a photo by placing one finger in the upper-left corner and one finger in the lower-right corner of the virtual photo and using the movement of the fingers to drive the rotation of the image until the user removes the fingers from the surface of the virtual photo. As a further example, scaling might take place by placing two fingers (i.e., one on either side) on an image such as a photo or another object, near the mid-point between top and bottom and then moving the fingers outwardly. Translation might take place by placing a single digit near the center of the object and moving the digit in any direction. Unfortunately, there are several problems with this methodology. First, the user must be familiar with the specific modes of interaction with the interactive display interface, and these techniques for manipulating an object are not as intuitive as might be desired. Second, the interactive display system must employ heuristics to determine which of a number of different modes of manipulating an object that the user wishes to initiate when the user's fingers are placed on the interactive display surface in specific configurations. Third, this approach supposes that fingers may be reliably detected and tracked on the interactive displays surface.

In another approach for manipulating an object with objects such as the user's fingers, the digits might be detected and tracked when in contact with the interactive display surface. This approach avoids the triggering of specific modes based on the initial configuration of the fingers on the object being manipulated, thereby avoiding the first and second problems described above. Unfortunately, this approach also supposes that fingers may be reliably detected and tracked, which is currently problematic.

SUMMARY

Briefly, aspects of the subject matter described herein make use of detected movement of points comprising one or more patches in images formed in response by light reflected from a physical object disposed adjacent to a display surface to determine a flow of the points the indicates how the physical object is moving, so that the system will produce an appropriate response to that movement. Unlike other approaches, it is not necessary to identify a physical object in order to respond to its movement. Instead, an appropriate manipulation of the graphical object can be determined based only on the movement of points in the patch representing a portion of the physical object that is either in contact or within a predefined distance from the display surface. For example, once a moving physical object associated with a graphical object is determined to be in contact with (or in some applications of the technique, within a defined distance from) the display surface, and the movement of the physical object determined by computing the flow of the points in the one or more patches, it is possible to determine how to manipulate the graphical object in response to the movement of physical object. For example, the motion of the physical object might indicate that the graphical object is to be translated, rotated, and/or resized. Alternatively, the movement of a physical object may be interpreted as a gesture associated with carrying out more complex functions in regard to controlling or manipulating the graphical object.

One aspect of this method processes the motion of points in a patch in an image of the display surface that represents at least a portion of a physical object that is being moved. In some applications of the subject matter discussed below, the movement of a physical object will only be applied in manipulating a graphical object if a portion of the physical object corresponding to the patch is actually touching the display surface. Alternatively, optical flow can be computed for points in one or more patches representing portions of the physical object that are proximate to the display surface.

Various techniques can be employed for determining if physical object is touching a display surface or is within a predefined distance from it. For example, an intensity of the light reflected from a physical object can be employed to indicate whether the physical object is touching or adjacent to a display surface. A transparent resistive sheet, a capacitance sensor, or an electromagnetic sensor or other related touch sensitive techniques might also be used on the display surface to detect the touch of the physical object.

An object such as a user's finger that is placed on the display surface often corresponds to a single patch, although other portions of the user's hand can also be seen in the image corresponding to the light reflected by the hand. Portions of an object that are either actually in contact with the display surface or at least proximate to it may thus appear as patches in the image of the display surface and the changes in position of points in these patches over a timer interval can be used in computing an optical flow for determining how a graphical object is to be manipulated. The optical flow is defined by vector fields that describe the movement of different points in a patch over a time interval.

Accordingly, a method is described for manipulating a graphical object presented on a display surface in response to movement of a physical object that is adjacent to the display surface. A physical object adjacent this display surface is detected in response to light reflected back from the physical object and appearing as one or more patches in an image of the display surface produced by a light sensor.

The method thus comprises the step of creating a first image of the display surface in which one or more patches are included that represent one or more portions of the physical object at a first time index. Similarly, a second image of the display surface is created in which the one or more patches are included. These one or more patches represent the one or more portions of the physical object at a second time index occurring after the first time index. Next, flow vectors describing a two-dimensional motion for at least some points in the one or more patches that occurs between the first time index and the second time index are determined. The flow vectors define an optical flow for the one or more portions of the one or more physical objects. The graphical object can then be manipulated by applying the optical flow.

Another aspect of the subject matter described herein is directed to a memory medium on which are stored machine executable instructions for controlling a user interface based on input derived from optical flow.

Still another aspect of the subject matter described herein is directed to an apparatus for detecting, applying, and displaying manipulation of a graphical object, based on an optical flow determined in response to manipulation of a physical object. The system includes a display surface on which the graphical object is presented and adjacent to which the physical object can be manipulated. A light source emits light that is reflected from the physical object and sensed by a light sensor. A processor is in communication with the light sensor, and with a memory that stores data and machine instructions. When executed by the processor, the machine instructions cause a plurality of functions to be carried out, generally consistent with the steps of the method described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

BRIEF DESCRIPTION OF THE DRAWING FIGURES

Various aspects and attendant advantages of one or more exemplary embodiments and modifications thereto will become more readily appreciated as the same becomes better understood by reference to the following detailed description, when taken in conjunction with the accompanying drawings, wherein.

Figure 4A:
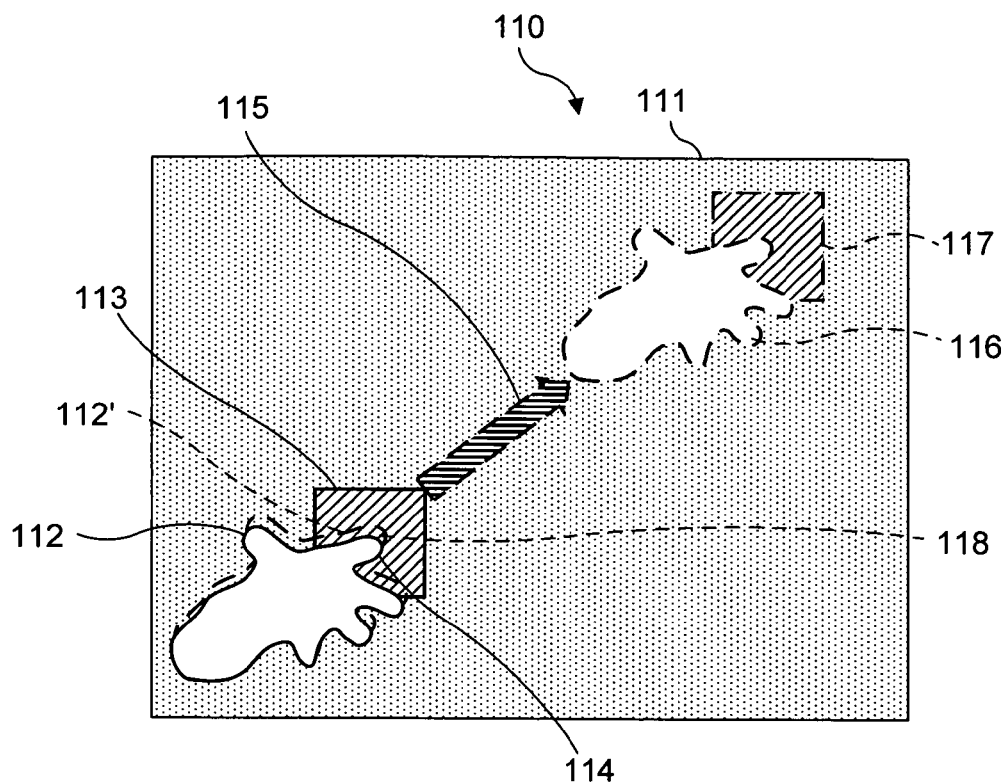
Figure 4B:
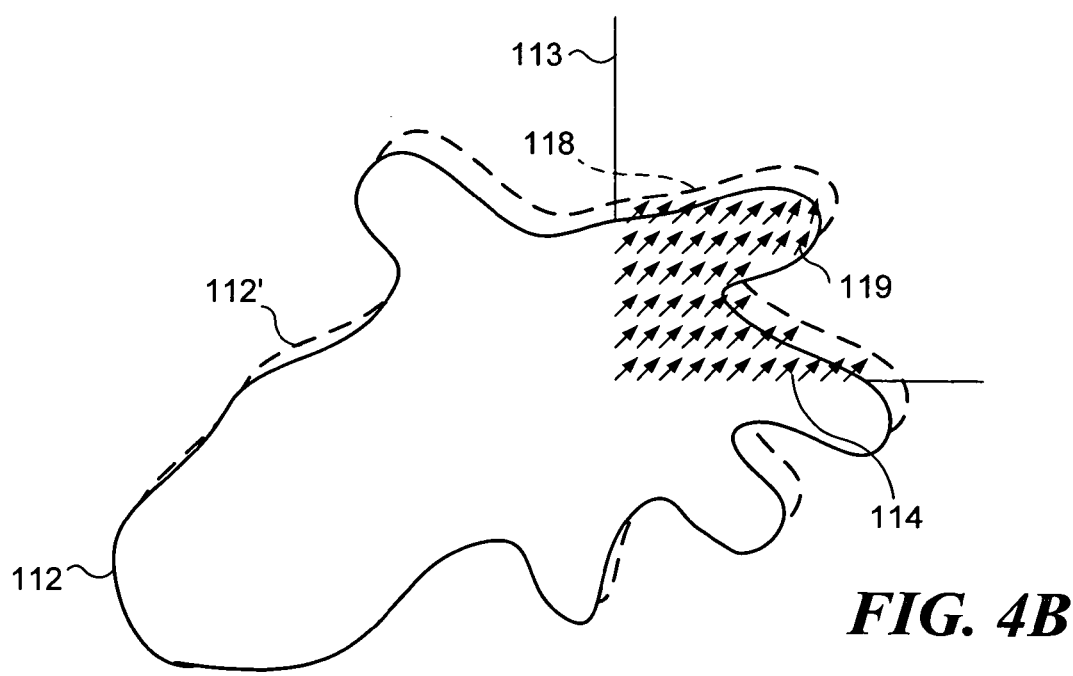
Figure 5:
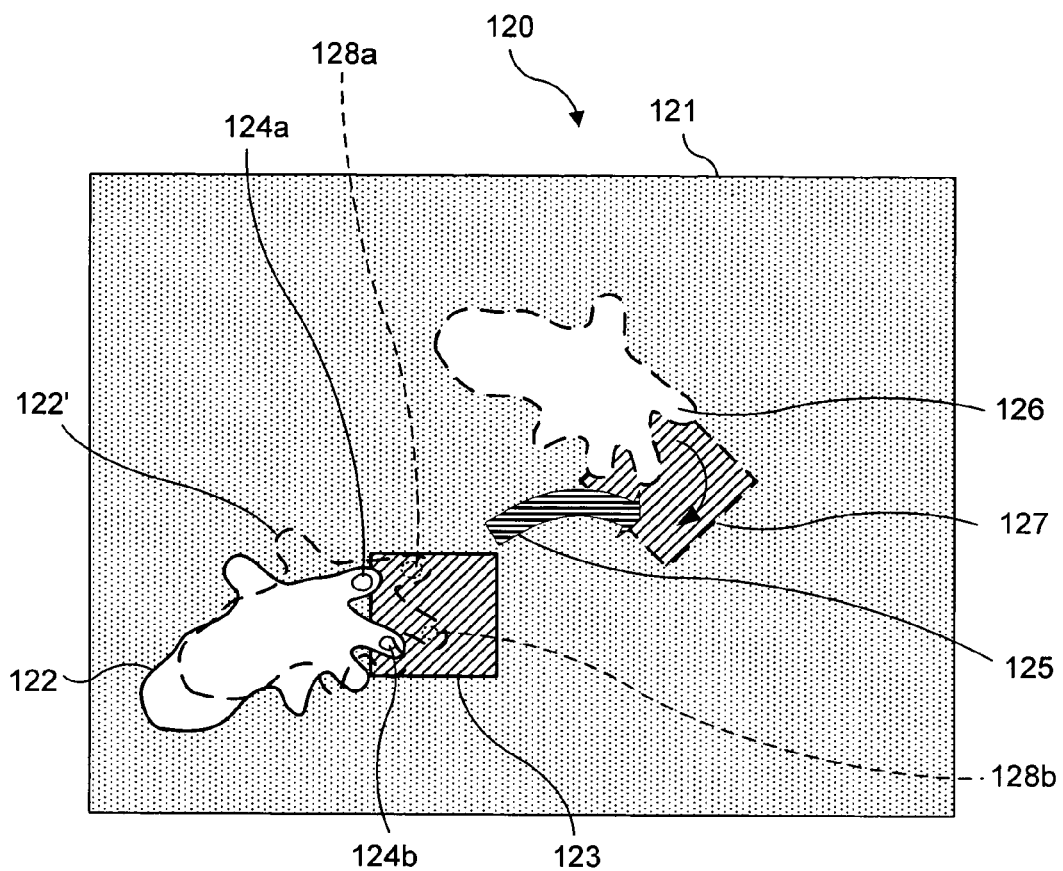
Figure 6:
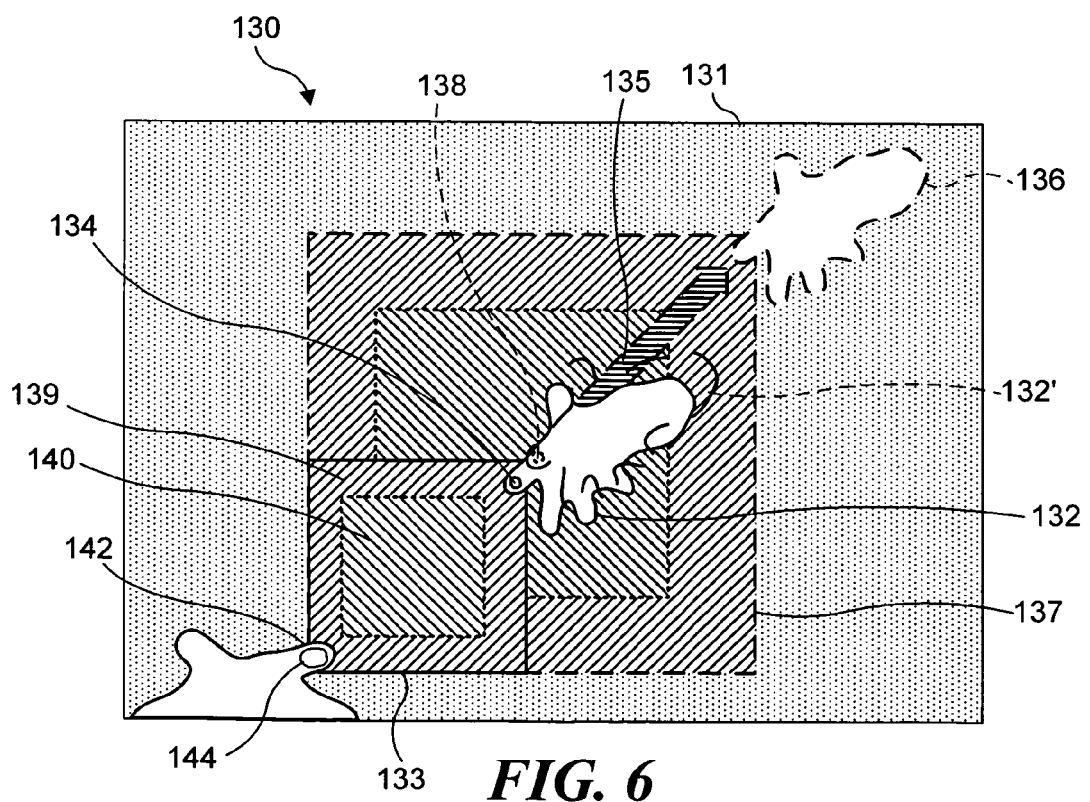
Figure 7:
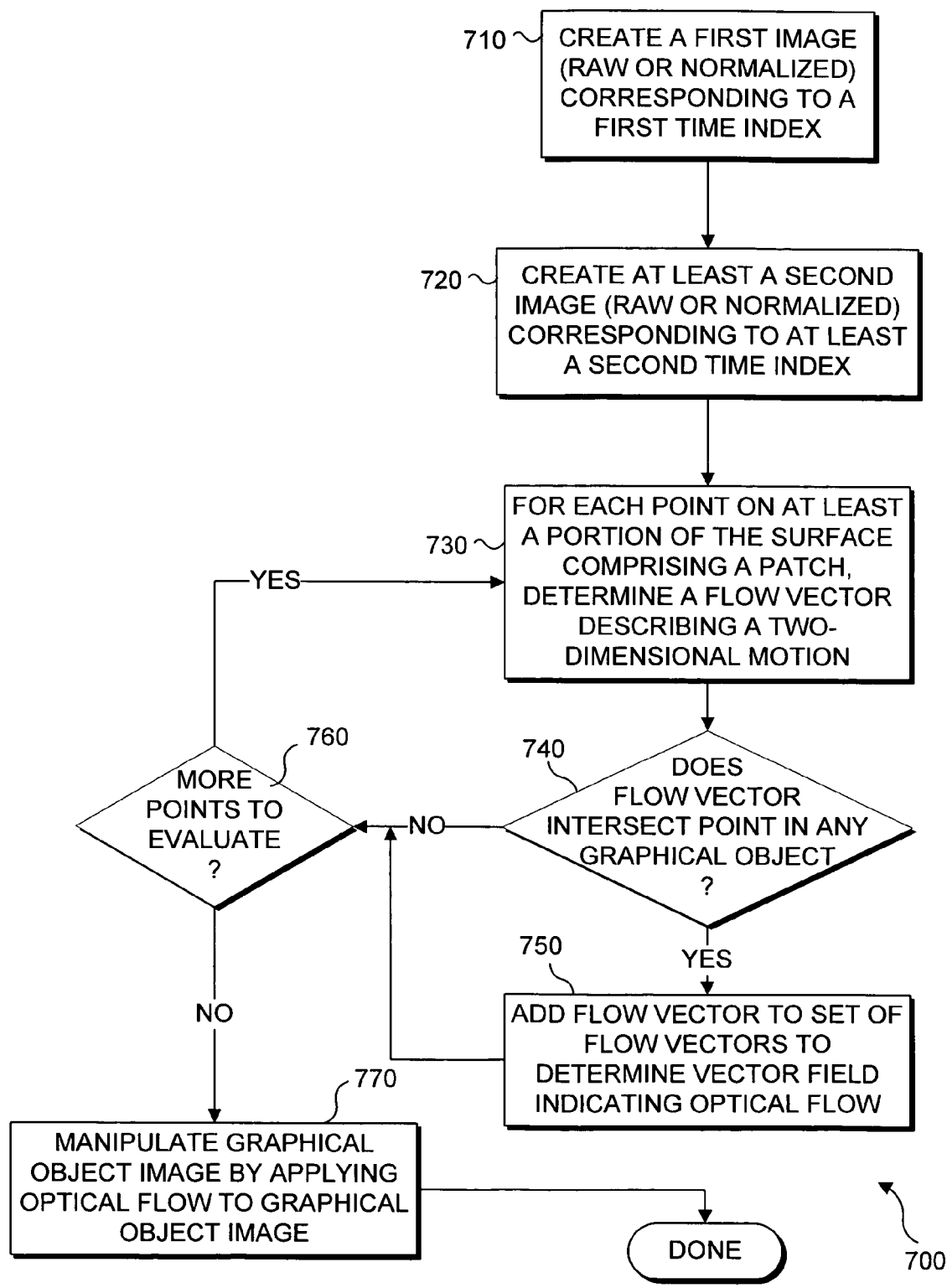
Figure 8:
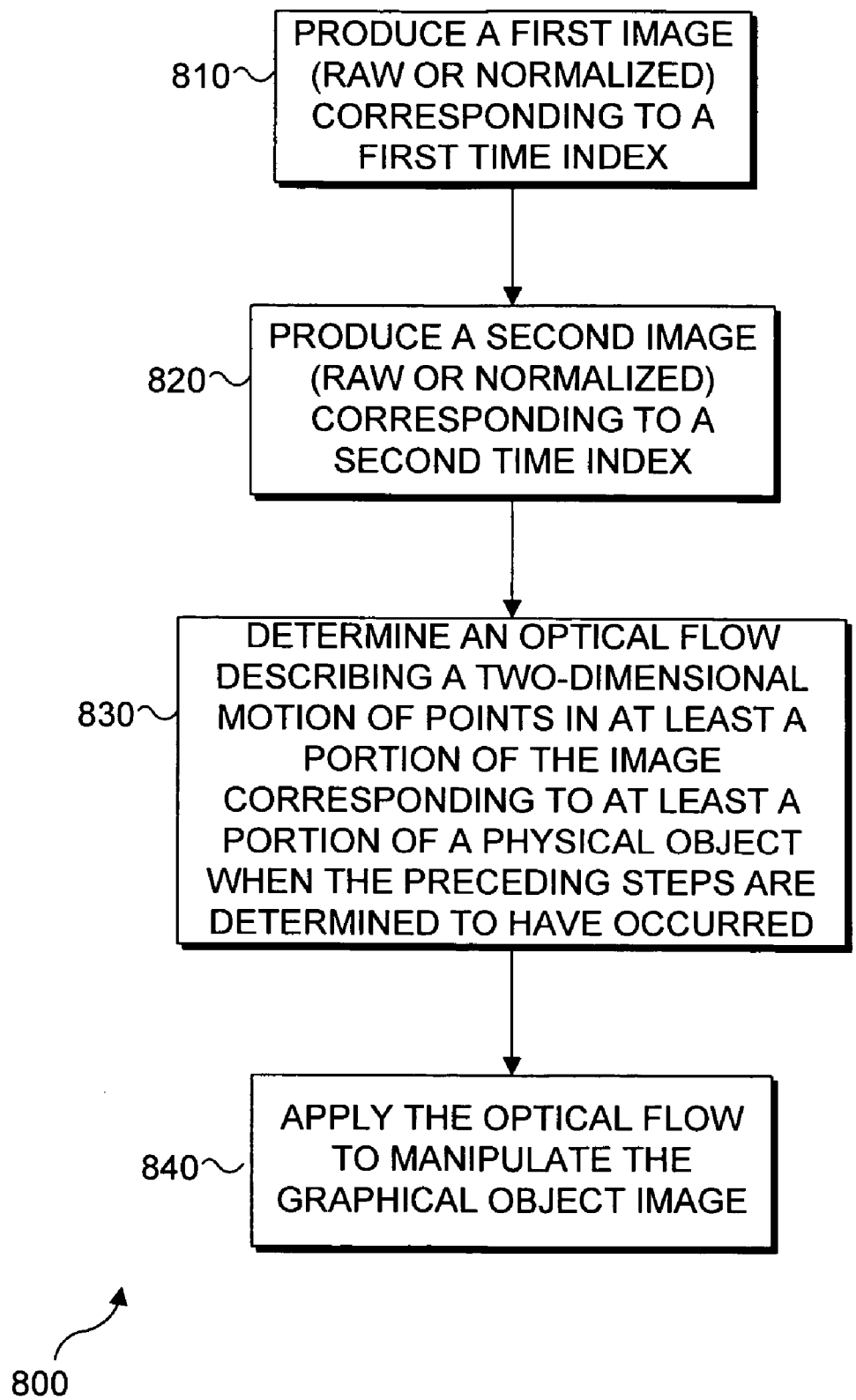

FIG. 4A is an exemplary schematic diagram representing a normalized image (although the texture of the gray scale normalized image is not shown to simplify the illustration) of a hand hovering above the display surface and having a fingertip in contact with a graphical object image on the display surface of the interactive display table, showing the patch representing a fingertip moving while in contact with the display surface, within the graphical object image, and thereby producing an optical flow that is applied to manipulating the graphical object image;

FIG. 4B is an enlarged view of the patch representing the fingertip moving in FIG. 4A during a time interval (again, not indicating the texture of the gray scale normalized image), showing the field vectors for points in the patch and also within a graphical object, where these field vectors for these points are used to define an optical flow for manipulating the graphical object;

FIG. 5 is a schematic diagram illustrating a normalized image (although the texture of the gray scale normalized image is not shown to simplify the illustration) of a hand hovering above the display surface, with patches representing fingertips in contact with the display surface and moving into contact with a graphical object image presented on the display surface of the interactive display table, and showing the hand and fingertip moving while in contact with the surface of the display and within the graphical object image, motion of the hand and fingertip indicating an optical flow that is applied to translate and rotate the graphical object image;

FIG. 6 is a schematic diagram illustrating an image (although the texture of the gray scale normalized image is not shown to simplify the illustration) of a hand hovering above the display surface and having a patch representing a fingertip in contact with a portion of a graphical object image presented on the display surface of the interactive display table, and showing the (hand and) fingertip moving while in contact with the display surface so that the patch representing the fingertip is within the portion of the graphical object image, thereby producing an optical flow that is applied to manipulate the graphical object image;

FIG. 7 is a flow chart showing exemplary logical steps for manipulating a graphical object with a physical object, using an optical flow methodology as disclosed herein; and FIG. 8 is a flow chart showing exemplary logical steps for controlling a user interface image based on an input derived from optical flow for a moving physical object, as disclosed herein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

Exemplary Computing System for Implementing Present Invention

Figure 1:
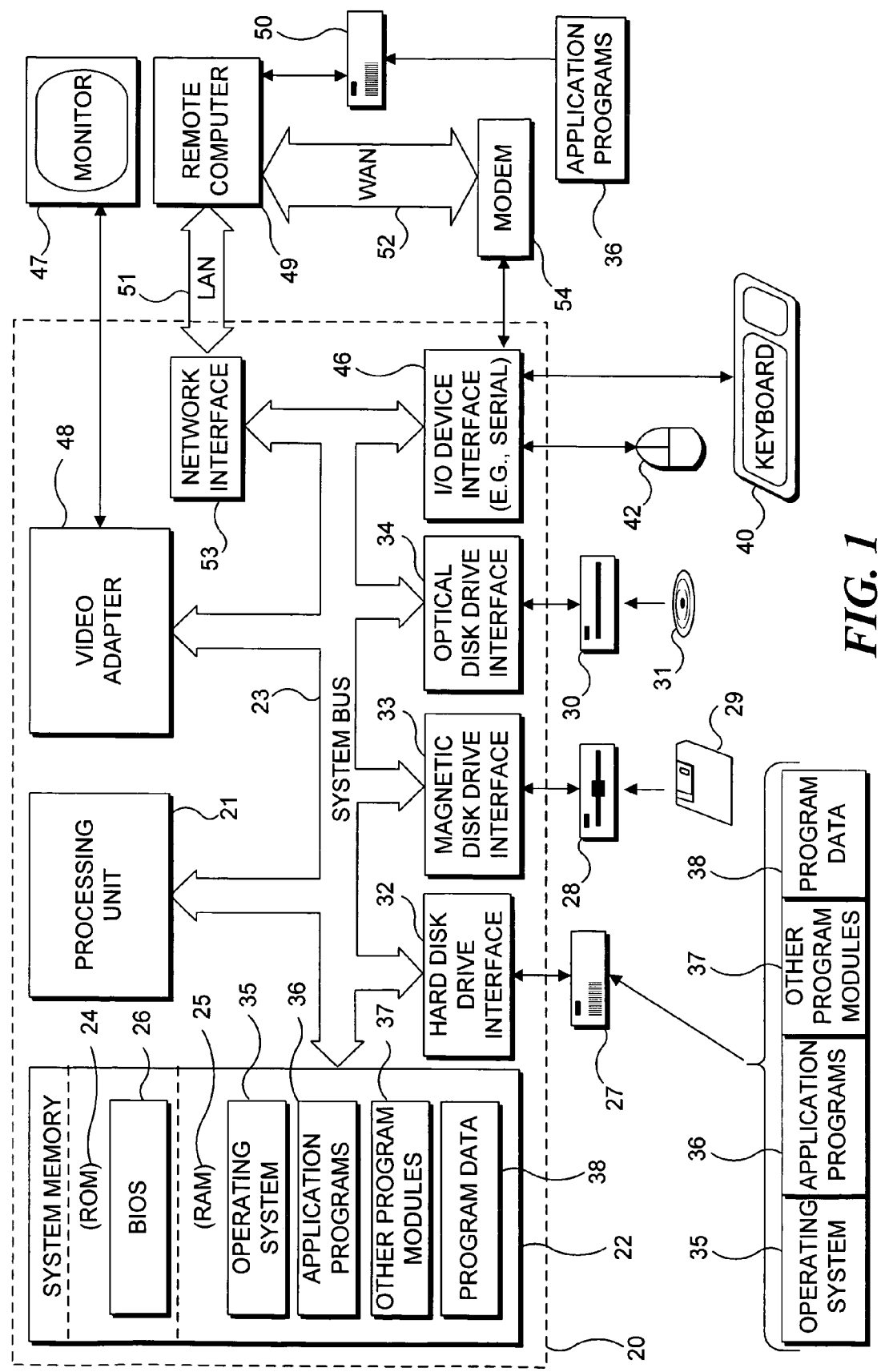
FIG. 1 is a functional block diagram of a generally conventional computing device or personal computer (PC) that is suitable for use with an interactive display table in connection with various exemplary aspects for manipulating a graphical image as discussed below.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). Also, a digital video camera in the interactive display may be coupled to an appropriate serial I/O port, such as to a USB version 2.0 port on I/O interface 46. Optionally, a monitor 47 can be connected to system bus 23 via an appropriate interface, such as a video adapter 48; however, an interactive display table like that used in connection with the subject matter discussed herein for manipulating graphical objects can provide a much richer display and interact with the user for input of information and control of software applications and is therefore preferably coupled to the video adaptor. But the monitor may be included as well. It will be appreciated that PCs are often coupled to other peripheral output devices (not shown), such as speakers (through a sound card or other audio interface—not shown) and printers.

Various aspects of the approach disclosed below may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Display Table

Figure 2:
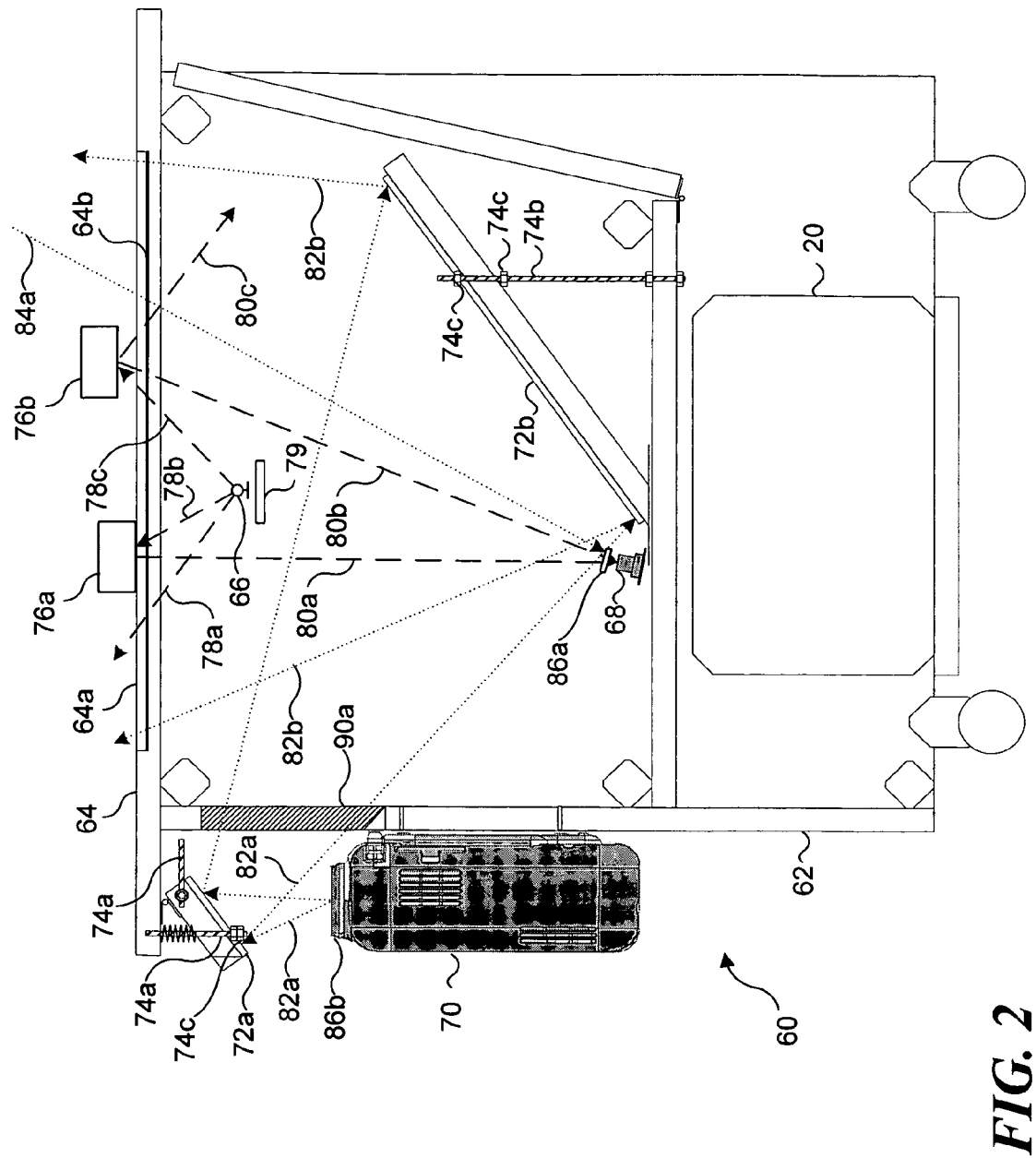
FIG. 2 is an illustration of the interior of an exemplary interactive display table showing hardware components included, and the paths followed by light within the interactive display table, and exemplary objects disposed on and above the surface of the interactive display table.

In FIG. 2, an exemplary interactive display table 60 is shown that includes PC 20 within a frame 62 and which serves as both an optical input and video display device for the PC. It should be emphasized that the subject matter discussed herein can be implemented on other types of display surfaces and with other types of interactive systems besides this exemplary embodiment. To employ this technology, any system can be used that can produce an image of a graphical object on a display surface as well as image a physical object moving proximate to (or in contact) with the display surface. If an application requires that the movement of the physical object only be applied in manipulating the physical object if the physical object is in contact with and/or proximate to the display surface, then the system must be able to sense the physical object touching the display surface and/or its proximity to the display surface.

In the cut-away view of the exemplary interactive display table in FIG. 2, rays of light used for displaying text and graphic images are generally illustrated using dotted lines, while rays of IR light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The IR light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm or palm) may be above the table while another portion (such as the user's finger) is in actual contact with the display surface. In addition, an object may include an IR light reflective pattern or coded identifier (e.g., a bar code) on its bottom surface that is specific to that object or to a class of related objects of which that object is a member. Accordingly, although not required in the present subject matter, the imaging signal from digital video camera 68 can also be used for detecting each such specific object, as well as determining its orientation, based on the IR light reflected from its reflective pattern, in accord with the present invention.

Figure 3:
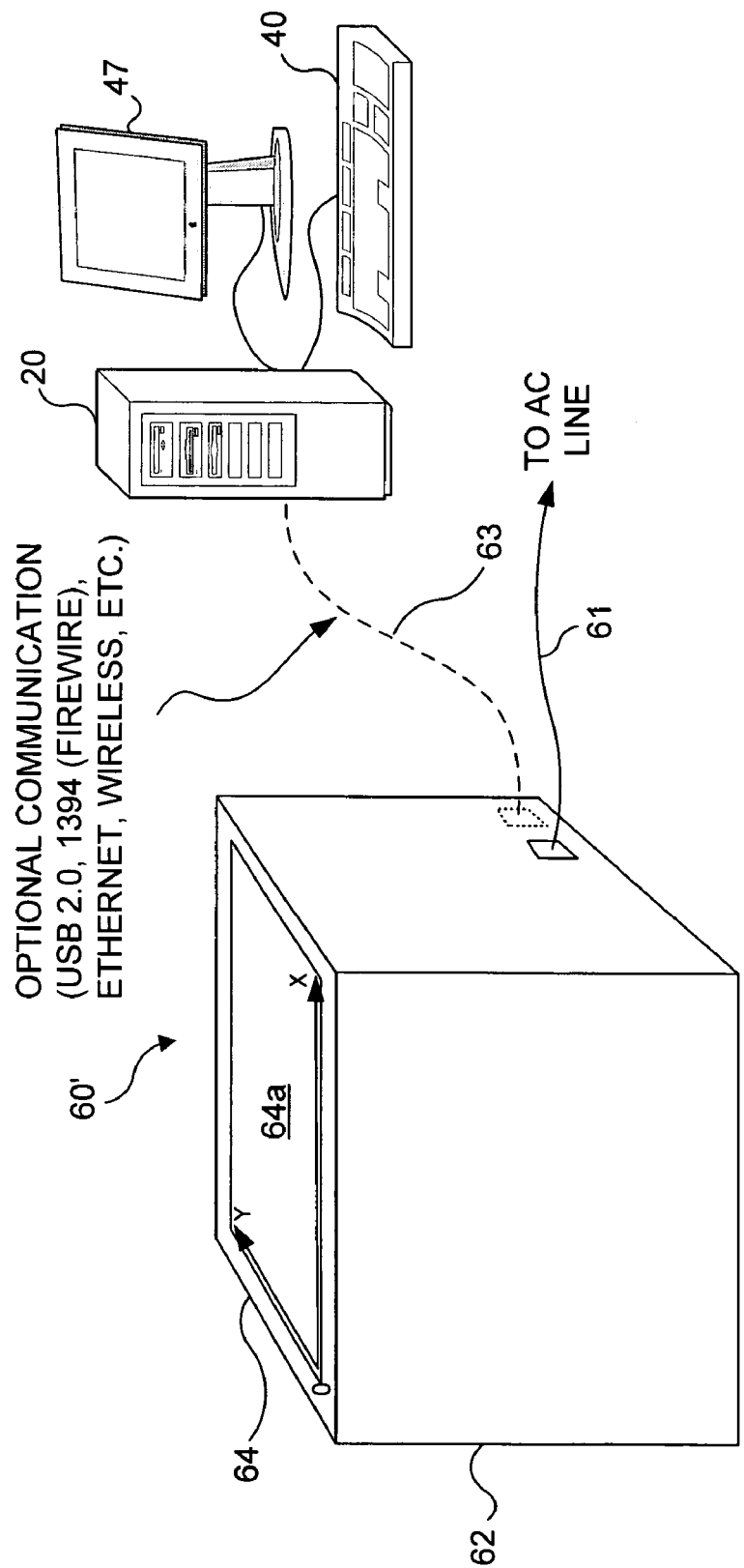
FIG. 3 is an isometric view of an exemplary interactive display table that is coupled to a PC disposed externally of the interactive display table.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47 and keyboard 40, as mentioned above). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If the interactive display table is connected to an external PC 20 (as in FIG. 3) or to some other type of external computing device, such as a set top box, video game, laptop computer, or media computer (not shown), then the interactive display table comprises an input/output device. Power for the interactive display table is provided through a power lead 61, which extends from frame 62 and is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table.

An important and powerful feature of the interactive display table (i.e., of either embodiments discussed above in regard to FIGS. 2 and 3) is its ability to display graphic images or a virtual environment for games or other software applications and to enable an interaction between the graphic image or virtual environment visible on display surface 64a and identify objects that are resting atop the display surface, such as a object 76a, or are hovering just above it, such as a object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

Input Thresholds

In FIGS. 4A/4B, 5, and 6, illustrations 110, 120, and 130 respectively represent exemplary normalized IR images 111, 121, and 131 of the display surface derived from a raw IR image of the display surface, as seen by the digital video camera disposed within the interactive display table described above, although the texture of physical objects disposed in contact with or proximate to the display surface that would normally be evident in such a normalized gray scale image is not shown, for the sake of simplicity. These Figures instead more closely correspond to what would be seen after processing (filtering) the normalized image with an input threshold set to include only pixels having an intensity greater than a threshold value, which is one technique that is used to determine if a physical object is proximate to or in contact with the display surface, since the higher intensity pixels indicate portions of a physical object that are nominally closer to the display surface than the portions represented by pixels of lower intensity, and the highest intensity pixels indicate portions of the physical object that are in contact with the display surface. While the appearance of the physical objects in the images represented by FIGS. 4A/4B, 5, and 6 does not represent a true gray scale normalized image view of a physical object, the Figures are still helpful in understanding the technique used to determine optical flow based upon the movement of the physical objects, as explained below.

Also respectively shown for purposes of reference in these Figures, although they are NOT visible in the normalized IR images, are graphical objects (i.e., virtual object images) 113, 123, and 133 projected onto displays surface 64a using visible light. Physical objects touching the display surface and physical objects above (proximate) the display surface that reflect IR light are simply represented by the white or "on" pixels in the illustrated images of physical objects 112, 122, and 132 at time t−1. These white regions thus represent the IR light reflected by a physical object (in this example, the user's finger(s) and hands) contacting or proximate the user-interactive side of display surface 64a in this illustrative application of the present technique. Patch 114 includes points (or pixels) that are proximate to (but not in contact with) the display surface, while patches 124a/124b, 134, and 142 respectively include points (or pixels) in the normalized image corresponding to portions of physical objects 122, 132, and 142 that are in contact with both the display surface and one of the graphical objects at a first time, t−1. Patch 118 includes points that are proximate to (but not in contact with) the display surface, while patches 128a/128b, 138, and 144 respectively include points (or pixels) of the normalized image corresponding to portions of physical objects 112', 122', 132', and 142 that are in contact with both the display surface and one of the graphical objects at a second time, t, after movement of the physical objects has occurred as indicated. In this exemplary embodiment, the first and second times t−1, and t correspond to the timing of successive image frames, and further movement of the physical objects continues to contribute to the determination of optical flow for each such physical object over additional image frames of the display surface.

Although each of these simple examples illustrate the use of a user's hands and/or fingers as the physical objects for which optical flow is determined, it should be apparent that any physical object can be employed, since the movement of virtually any type of physical object proximate to or in contact with the display surface can be imaged, and points in patches of the image—either raw or normalized, can be used to determine optical flow that is applied in manipulating any type of graphical object, as discussed in detail below.

Vector Fields and Optical Flow of Physical Object

Clearly, a physical object can touch any portion of display surface 64a. However, when any point in one of physical objects 112, 122, 132, and 142 overlaps any portion of one of graphical objects 113, 123, and 133, the location of that point at that time is then referred to as a "hit" location. When a hit location is detected by comparison of an intersection between the location of the graphical objects projected on the display surface and one or more points or pixels in any patch representing one or more physical objects, the patch having the points at the hit locations can then be associated with the graphical object, and any detected movement of the physical object that provides an optical flow determined by analyzing flow vectors for points in the patch arising from the movement of the physical object can be used to manipulate the graphical object, as described below. The movement of the points in a patch representing a moving physical object is used to determine flow vectors for the points, and the flow vectors define a vector field that describes the movement and thus represents the "optical flow" of the physical object as it moves. Optical flows 115, 125, and 135 respectively represent the vector fields associated with movement of physical objects 112, 122, 132, and 142 (although physical object 142 is static and not moving in the example of FIG. 6). The vector fields and thus, the optical flows, for such physical objects are determined as described below, using the points in raw images, or normalized images 111, 121, and 131 that are obtained at successive times.

In operation, raw image of display surface 64a based on IR light reflected from physical objects adjacent to the display surface is acquired by digital video camera 68 (FIG. 2) at successive times (e.g., t−1 and t). Patches in the raw image can be used directly to determine the flow vectors for portions of a physical object that is in contact with or proximate to the display surface, but this exemplary technique uses the normalized image of the display surface determined from the raw image for this purpose. An optical flow algorithm is employed to calculate an optical flow based on the raw or normalized image of the display surface that is acquired at the various time increments. The optical flow can be calculated using any one of numerous methodologies available, such as, for example a block-matching algorithm, the Lucas-Kanade algorithm, the Horn and Schunck algorithm and the like. Methods for calculating optical flow are readily known in the art and need not be discussed in detail herein to enable one or ordinary skill to practice the method. The optical flow is defined by one or more vector fields that describe, at each point in the image, or on a discrete grid in the image, the two-dimensional motion of a portion of the image from time t−1 to time t. For each point in the image for which data are returned by the optical flow algorithm, a "hit" test is applied to determine if and which graphical object(s) currently being projected on the display surface intersect the point, i.e., whether the point in the patch is also a point within the graphical object. All flow vectors are collected for the points intersecting each of the graphical objects, i.e., for all points in patches at which a hit location is thus identified, and the corresponding optical flow is determined from the vector field provided by the set of collected flow vectors, and applied in manipulating the graphical object.

Examples Illustrating Manipulation of Graphical Objects

FIG. 4A illustrates a representation of the normalized image of a physical object 112 which is derived from the IR light reflected from a user's hand hovering above the display surface at least partly over graphical object 113 (e.g., a photographic image) that is being projected on the display surface of the interactive display table. In addition, FIG. 4A shows patch 114 corresponding to the user's hand and fingertips moving over the display surface to indicate a correspond manipulation of graphical object 113.

Normalized images of the display surface are acquired at successive times (e.g., at t−1 and t). As shown in this example, normalized image 111 of the display surface at time t−1 includes physical object 112 and graphical object 113, with patch 114 including points that overlap or intersect points in the graphical object. The normalized image of the display surface at time t would include physical object 112' and graphical object 113, showing how physical object 112' has moved so that patch 118 is now at a new location. An optical flow algorithm is determined based on the multiple normalized images acquired at the successive time increments to produce optical flow 115. For each point in the image for which data are returned by the optical flow algorithm (e.g., points in patches 114 and 118), a "hit" test is applied to determine if and which graphical objects intersect the point, thereby identifying a hit location. For each of the points in the graphical objects having a hit location, sets of flow vectors are collected and the optical flow defined by the resulting vector fields comprising these sets of flow vectors is associated with the graphical object and applied in manipulating the graphical object. The optical flow defined by the vector field will thus cause the graphical object to be manipulated in accord with that optical flow for as long as any hit location is detected, i.e., so long as any portion of the physical object is proximate the display surface. Alternatively, the graphical object can be manipulated in response to optical flow for a physical object so long as the physical object is in contact the display surface. Depending on the requirements of an application in which this technique is used, there can be a requirement for the physical object to actually touch the display surface to avoid unintended manipulation of a graphical object that could occur as a user inadvertently moves a hand or other physical object proximate to the display surface. Also, as discussed in greater detail below, in some cases, a graphical object can be manipulated by the optical flow of points in a patch representing a portion of a physical object even when the points of the graphical object do not intersect with the points in the patch.

An image of a physical object 116 and a graphical object 117 shown in phantom view in FIG. 4A respectively represent potential locations for the physical object representing the hand/fingertips of the user and the graphical object, if optical flow 115 continues to be applied in manipulating the graphical object through multiple iterations of the optical flow algorithm. In other examples, the positions of physical object 116 and graphical object 117 may be different depending on additional normalized images of display surface 111 acquired at various additional time increments, so that the optical flow is in a different direction or is varied over time so as to cause a different type of manipulation of the graphical object.

FIG. 4B illustrates flow vectors 119 for points at a hit location, i.e., where there is an intersection between the points of graphical object 113 and points of patch 114 representing physical object 112. Flow vectors 119 are determined for each such point as the physical object moves, as indicated by the image of physical object 112' at time t.

In another example, FIG. 5 illustrates the image of physical object 122, which is produced by the user's hand hovering above the interactive display, with two fingertips in contact with graphical object 123 on the display surface of the interactive display table, as indicated at patches 124a and 124b, and further showing the hand and fingertips moving while the fingertips remain in contact with the display surface and the graphical object. This motion of the physical object produces an optical flow that is applied to manipulate the graphical object in a different manner than the example of FIG. 4A. The optical flow in FIG. 5 corresponds to both translating and rotating physical object 112. However, as discussed in more detail below, even if the user contacted graphical object 123 with only one finger at patch 124a, the optical flow determined for points in this patch representing the region of contact of the user's single finger with the graphical object on the display surface can still indicate that the user has both translated the finger and rotated it, and the optical flow thus determined for the movement of only one finger can also be employed in translating and rotating graphical object 123 in the same fashion as illustrated in FIG. 5. Generally, it may be preferable to determine optical flow based upon the flow vectors of as many points of the physical object as possible Normalized image 121 of the display surface is acquired at successive time increments (e.g., t−1 and t). In the illustrated example, at time t−1, the normalized image of the display surface shown in FIG. 5 includes an image of physical object 122 and graphical object 123 with portions (i.e., two fingers) of physical object 122 touching the surface of normalized image 121 at patch 124a and patch 124b. Normalized image 121 of the display surface at time t would include the image of physical object 122' touching the surface of normalized image 121 at patches 128a and 128b. An optical flow algorithm is applied to the points in the multiple normalized images acquired at the successive time increments to produce an optical flow 125 that defines both a translation and a rotation to be applied to the graphical object. For each point in the normalized images at these different times for which data are returned by the optical flow algorithm (e.g., at least points in patches 124*a* and 124*b*, and patches 128*a* and 128*b*, but also, the points in the image of physical object 122), a "hit" test is applied to determine if and which graphical objects intersect the point. The hit test thus associates points in the image of physical object 122 with graphical object 123, so that the optical flow determined for these points in the images of physical object 122/122' will be applied in computing optical flow to manipulate graphical object 123. For all such points, vector flows are collected, yielding a vector field indicative of an optical flow that will be applied to manipulate the graphical object.

The image of a physical object 126 and a graphical object 127 represent potential locations for the hand and the graphical object discussed above, if optical flow 125 continues based on the optical flow determined for the points in the image of physical object 122 relative to graphical object 123. In other examples, the positions of the physical object and the graphical object after applying the continued optical flow determination may be different, depending on the additional normalized images of the display surface acquired at various additional successive time increments. It should be noted that the same result (i.e., both a translation and a rotation of the graphical object) could be obtained by determining the optical flow based on points in a patch representing the image of only a single finger as it is moved over and rotated in contact with the display surface and the graphical object.

Furthermore, it is important to understand that there are a several different ways to associate the vector field determined from a set of flow vectors with a graphical object on the display surface and to determine the optical flow applied in manipulating the graphical object. One approach intersects the vector field with the graphical object and use only the intersecting points, e.g., only the points in patches 124*a* and 124*b* and patches 128*a* and 128*b* to determine optical flow, or the logic can take all of the flow vectors regardless of where the points are located. Or, as was done in the approach discussed above in connection with the example of FIG. 5, it is possible to determine the optical flow based on the flow vectors for all points that are within the image of a physical object (e.g., the image of physical object 122) having any portion(s) (such as patches 124*a* and 124*b* and patches 128*a* and 128*b*), with points which intersect points in the graphical object. In yet another approach, optical flow can be determined based on the flow vectors for all of the points within a given radius of a touch point on the display surface (where the touch point can be determined, for example, by the relatively higher intensity of the light received by the light sensor from the portion of the physical object touching the display surface, or by a touch sensor or touch sensing display surface), regardless of whether these points lie on the graphical object.

In yet another example, FIG. 6 illustrates the image for physical object 132 produced by the user's hand hovering above the display surface and having a fingertip in contact with a graphical object such as a photographic image that is projected onto the display surface. The graphical object of this example has a first portion 140 and a second portion 139 that surrounds the first portion, corresponding for example, to the border of the photographic image. The hand and fingertip are moving while the fingertip is in contact with the surface of the display at a patch 134, and with second portion 139 of graphical object 133. The movement of points comprising patch 134 is evaluated by to produce an optical flow that is applied to manipulate the graphical object by scaling it. Specifically, the corner of the border that is touched at points included in patch 134 is dragged, as determined by the optical flow, to produce a larger photographic image in this example. While in the example of FIG. 6, the graphical object is thus being enlarged, it will be appreciated that scaling can also be applied to reduce the size of the graphical object.

As shown in FIG. 6, the image of physical object 142 corresponding to the other hand and fingers of the user includes points in a patch 144 that is both in contact with the display surface and intersecting points in graphical object 133 disposed at its opposite lower left corner. The portions of the user's finger in contact with the display surface as represented by patch 144 does not move, and each of the points in patch 144 has substantially a (0, 0) flow vector. Patch 144 thereby "anchors" that corner of the graphical object, so that the movement of the user's other hand and fingertip at patch 134 effects a scaling of the graphic object rather than a translation. The scaling is applied to the upper right corner of the graphical object based on the optical flow produced by points in patch 134 that are moving relative to the points in patch 144. Alternatively, both points in patch 134 and in patch 144 can be moved by moving the user's two hands relative to each other, to scale the graphical object. For example, by moving the physical objects (e.g., hands and fingertips) toward each other, graphical object 133 can be scaled so as to reduce its size.

As shown in FIG. 6, normalized image 131 of the display surface is acquired at various times (e.g., t−1 and t). For example, at time, t−1, normalized image 131 of the display surface includes the image of physical object 132 and indicates that a portion of the physical object (i.e., a fingertip of the user in this example) is touching the display surface at patch 134 in the normalized image. The normalized image of the display surface at time increment t would include the image of a physical object 132' and would indicate that the user's fingertip at time t is touching the display surface at a patch 138. For each point in the image for which data are returned by the optical flow algorithm (e.g., points in patches 134 and 138), a "hit" test is applied to determine if and which graphical objects intersect the point. For each such point, the flow vectors for those points are collected and used to determine the vector field and thus, the optical flow. A physical object 136 and a graphical object 137 (shown in phantom view) represent potential locations for the hand and a portion of the graphical object (e.g., a section of an enlarged picture) if optical flow 135 continues based on the present locations and trajectory of the points in patch 134 that intersect points in graphical object 133. In other examples, the positions of physical object 136 and graphical object 137 may be different depending on additional normalized images of display surface 131 acquired at various additional time increments. Also, different applications may apply the optical flow shown in FIG. 6 in a different manner, e.g., by scaling the graphical object without maintaining its aspect ratio—perhaps as specified by a user setting.

One Example for Determining Graphical Object Manipulation Based Upon Optical Flow Several examples showing how the optical flow defined by the optical flow vectors of points comprising a patch representing a physical object in an image is used to manipulate a graphical object are discussed below. Optical flow is successively computed from the most recently acquired image and the previous image. There are a number of methods to compute optical flow. An exemplary approach uses a simple block matching technique in which, for each point (x,y) on a regular grid in successive images of the display surface, an integer vector quantity (dx,dy) is determined, such that a patch in the image centered on (x,y) at time t−1 most closely matches the patch in the image centered on (x+dx,y+dy) at time t. In this calculation, patches are compared by computing the sum of pixel wise absolute differences (low values indicate close match). For a given patch in an image, (dx,dy) is selected to minimize:

$$\sum_{x,y \in patch} |I_{t-1}(x, y) - I_t(x + dx, y + dy)| \quad (1)$$

In this exemplary technique, a flow field may be characterized as simultaneous rotation in the image plane, uniform scaling, and two-dimensional translation. If the physical object being imaged is mostly rigid, this technique can be used to determine change in the orientation of the physical object in the image plane and other variables.

For the flow field described by $x_i=[x_i \ y_i]^T$ and $dx_i=[dx_i \ dy_i]^T$, each point $x_i$ moves to $x_i'=[x_i' \ y_i']^T = x_i + dx_i$ by a rotation $\theta$ in the image plane, a uniform scaling s and a translation t:

$$R = \begin{bmatrix} \cos\theta & -\sin\theta \\ \sin\theta & \cos\theta \end{bmatrix} \quad (2)$$

$$x_i' = sRx_i + t \quad (3)$$

First solve for rotation. With means $$\bar{x} = \frac{1}{N}\sum_i x_i \text{ and } \bar{x}' = \frac{1}{N}\sum_i x_i'$$

solve for $\theta$:

$$\theta = \arctan\left[\frac{(x_i - \bar{x})(y_i' - \bar{y}') - (y_i - \bar{y})(x_i' - \bar{x}')}{(x_i - \bar{x})(x_i' - \bar{x}') + (y_i - \bar{y})(y_i' - \bar{y}')}\right] \quad (4)$$

Scaling factor s and translation $t=[t_x \ t_y]^T$ may be recovered by least squares:

$$z = [s \ t_x \ t_y]^T \quad (5)$$

$$M_i = \begin{bmatrix} Rx_i & 1 & 0 \\ & 0 & 1 \end{bmatrix} \quad (6)$$

$$x_i' = M_i z \quad (7)$$

$$z = \left(\sum_i x_i'^T M_i\right)\left(\sum_i M_i^T M_i\right)^{-1} \quad (8)$$

It may not be obvious that this formulation allows for rotation and scaling about any point. For example, consider rotation about a point $t_R$:

$$x_i' = s(R(x_i - t_R) + t_R) + t \quad (9)$$
$$= sRx_i + t'$$

where setting $t'=-sRt_R+st_R+t$ produces the original form of Equation (3).

This exemplary implementation acquires grayscale images of the display surface at a predefined rate. For example, for a display surface having a 640×480 pixel resolution, grayscale images of the display surface showing physical objects proximate thereto might be created 30 times per second, i.e., at 30 Hz. To minimize processing load, flow vectors are computed for only a percentage of the pixels, e.g., for every 32nd pixel on a regular grid of the display surface, yielding a 20×15 flow field for the entire display surface in this example. Each of dx and dy are allowed to vary by 6 pixels in either direction on 16×16 pixel patches, and the optimal (dx,dy) for each grid point is found by exhaustive search over this range. The flow field is computed at the full frame rate (30 Hz).

There are a few details to note about the optical flow computation. First, correct values (dx,dy) are attainable only if there are adequate features such as edges or corners in the patch under consideration. In practice, it is necessary to determine the merit of the computed (dx,dy) at a patch. The match score corresponding to (dx,dy)=0 is compared against the best score for any (dx,dy) and the flow information at this patch is discarded if the best score is not significantly better than that corresponding to (dx,dy)=0. This approach typically avoids the problem of spurious flow vectors computed on regions of the image without adequate texture, such as may be found on the smooth area on the back of the hand.

A second consideration is that this method finds integer values for dx and dy, which would seem to limit the overall precision of motion information derived from the flow, but typically a hand under the camera will generate many valid flow observations. While a single flow observation may be a noisy estimate of motion, when averaged together the collection of flow vectors result in a vector field having a more stable estimate of motion.

While this exemplary approach is but one method of solving for rotation, scaling, and translation, the method disallows skew and provides for scaling in all directions (e.g., where the aspect ratio of the graphical object is to be maintained when scaling). Other methodologies may be employed that disallow or limit rotation, scaling, or transition. Methods for calculating components of flow vectors are known in the art and this exemplary approach is provided here for enablement purposes. The methodology presented here should clearly not be viewed as limiting the scope of the subject matter described herein.

In operation, after the rotation, scaling, and translation is recovered for normalized images at times t−1 and t, the parameters may be directly applied to the transformation matrix associated with the graphical objects. In one embodiment, with reference to the examples of FIGS. 4A/4B, 5 and 6, the transformation approximating the small motion of the points in a patch occurring from t to t+1 may be directly applied to the transformation representing a previous motion of graphical objects 113, 123, and 133, where the motion is scaling, translation, or rotation. It should also be noted that in some applications, the only manipulation of a graphical object that may be of interest is a translation, while in another application, the only manipulation might be a rotation of the graphical object. Accordingly, only the manipulation of interest would be applied to manipulate the graphical object. For example, if the manipulation was to move a slider control to enable user input of a parameter in an application, the values for rotation and scaling that are determined from optical flow would simply be ignored, so that the translation could be applied to the slider control.

A further alternative would provide for mapping a particular movement of a physical object to an "allowed" manipulation of a graphical object. For example, a physical object might be translated, and the translation that was determined from the optical flow will then be applied in rotating a graphical control knob. As a further variation, a scaling factor can be applied, so that an optical flow rotation of a physical object is multiplied by a predefined scaling factor when rotating the graphical object. Or, a three-dimensional (3-D) graphical object, such as a teapot, that is displayed by an application and constrained to only rotate about a central axis, might be visually rotated by translating a physical object in contact with a portion of the teapot, such as its handle. As yet another option, physical laws could be applied in determining the manipulation of a graphical object in response to the optical flow of a moving physical object. Clearly, optical flow can be used by different software applications in almost an infinite variety of ways to manipulate a graphical object.

It should also be appreciated that if only a single graphical object currently being displayed on the display surface can be manipulated by the user moving a physical object, it will not be necessary for the motion of the physical object to intersect the graphical object on the display surface. Instead, motion of the physical object anywhere on the display surface can be applied to determine the optical flow for the moving physical object to manipulate the graphical object. In other words, the patch representing at least a portion of the moving physical object does not then need to overlap with any portion of the graphical object that is being manipulated, since no other graphical object can be manipulated in response to the optical flow.

FIG. 7 is a flow diagram 700 generally illustrating an exemplary method for manipulating a graphical object in response to an optical flow determined for a physical object that is being moved by a user next to a display surface of an interactive display system. In at least one embodiment, flow diagram 700 is implemented with components of the exemplary operating environments of FIGS. 1-3. Preferably, one or more steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

At a step 710, a first image (raw or normalized) is created that corresponds to a first time index and includes all patches representing physical objects included in the first image. One or more graphical objects will also currently be displayed on the display surface. In one embodiment, the step of creating the first image may additionally include determining whether any portion of a physical object is in contact with or at least proximate to the display surface at the first time index. Step 710 may additionally include the step of determining whether a first coordinate location of a point in a patch of the first normalized image is within a first graphical object.

At a step 720, a second image (raw or normalized) is created corresponding to a second time index and including all patches representing physical objects included in the second image at the second time index. In one embodiment, the step of creating the second normalized image corresponding to the second time index may additionally include determining whether any portion of a physical object is in contact with or at least proximate to the display surface at the second time index.

At a step 730, at each point on at least a portion of the image of the display surface comprising a patch, a flow vector is determined that describes a two-dimensional motion for the point in between the first and second images. In one embodiment, the flow vector is determined based any one of the many algorithms designed for such determinations, such as, for example a block-matching algorithm, Lucas-Kanade algorithm, Horn and Schunck algorithm, and the like. The flow vector of each such point thus approximate a two-dimensional motion for the points in patches of the images representing the one or more physical objects, at least as described in connection with FIGS. 4A, 4B, 5, and 6, above.

At a decision step 740, a determination is made as to whether the flow vector for the point intersect any graphical object currently displayed on the display surface. If so, i.e., if there is a hit, the flow vector for that point is added to a set of flow vectors for the patch in a step 750. Optical flow is determined in step 750 by approximating the motion indicated by the set of flow vectors comprising a vector field. In one embodiment, a determination is made as to whether the flow vector for a point intersects any graphical objects displayed on the display surface, at least as described in connection with the examples of FIGS. 4A, 4B, 5, and 6, above. The set of flow vectors such points corresponds to the vector field that defines an optical flow, and thus, indicates the motion of the physical object.

If the determination in decision step 740 is negative or after step 750, a decision step 760 determines if any more points remain to be evaluated, to determine their flow vectors. If so, the logic continues with step 730. Otherwise, a step 770 provides for manipulating the graphical object by applying the optical flow that indicates how the graphical object will be manipulated, e.g., one or more of rotated, translated, and resized. The logic is then done processing the current pair of images of the display surface, and can process the next image to determine if movement of a physical object should continue to be evaluated to determine optical flow for points of a portion of the image of the physical object to further manipulate any graphic image.

FIG. 8 is an operational flow diagram 800 generally illustrating an exemplary method for controlling a user interface image based on an input derived from optical flow for a moving physical object. In at least one embodiment, this method is implemented with components of the exemplary operating environments of FIGS. 1-3. Preferably, one or more steps of the method in flow chart 800 are embodied in a computer readable medium containing computer readable code such that a series of steps are implemented when the computer readable code is executed on a computing device. In some implementations, certain steps of the method are combined, performed simultaneously, or in a different order, without deviating from the objective of the method.

At a step 810, a first normalized image is produced corresponding to a first time index. The first image (raw or normalized) includes a location on the user interface of a graphical object at a time corresponding to a first time index. The first image further includes points for at least a portion of a physical object at a location on the user interface at the first time index. In at least one embodiment, the first image (raw or normalized) is produced at the time corresponding to the first time index, as described above in connection with FIGS. 4A, 4B, 5, and 6.

At a step 820, a second image (raw or normalized) is produced corresponding to a second time index. The second image includes points for at least a portion of the physical object at a location on the user interface image at the second time index. In at least one embodiment, the second image is produced corresponding to the second time index as described above in connection with FIGS. 4A, 4B, 5, and 6.

At a step 830, an optical flow is determined that describes a two-dimensional motion of points in at least a portion of the physical object when the previous steps are determined to have occurred. In one embodiment, the optical flow is determined that describes a two-dimensional motion of the points in at least the portion of the physical object when the previous steps are determined to have occurred as described in connection with FIGS. 4A, 4B, 5, and 6, above.

At a step 840, the optical flow is applied to manipulate the graphical object image. In at least one embodiment, the optical flow is applied to the graphical object image as described above in connection with FIGS. 4A, 4B, 5, and 6.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of manipulating a graphical object presented on a display surface in response to a movement of one or more physical objects that are adjacent to the display surface, comprising the steps of:
   (a) creating a first image of the display surface in which one or more patches are included that represent one or more portions of the physical object at a first time index, and wherein the one or more patches include a plurality of points that intersect points in the graphical object at the first time index;
   (b) creating a second image of the display surface in which the one or more patches are included and which represent the one or more portions of the physical object at a second time index occurring after the first time index;
   (c) determining flow vectors describing two-dimensional, in x and y directions, motion for at least some of the plurality of points that intersect points in the graphical object in the one or more patches at the first time index and the second time index, the optical flow vectors defining one or more vector fields that define an optical flow for the one or more portions of the one or more physical objects wherein determining flow vectors describing a two-dimensional, in x and y directions, motion for at least some of the plurality of points that intersect points in the graphical object comprises comparing patches by computing the sum of pixel wise absolute differences such that for a given patch in an image, (dx, dy) is selected to minimize $$\sum_{x,y \in patch} |I_{t-1}(x, y) - I_t(x + dx, y + dy)|; \text{ and}$$

(d) manipulating the graphical object by applying the optical flow to the graphical object presented on the display surface.

2. The method of claim 1, wherein the step of creating the first image comprises the step of processing at least one of a raw image of the display surface, or a normalized image produced from the raw image, wherein the raw image is made at the first time index in response to light reflected from the one or more physical objects and received by a light sensor.

3. The method of claim 1, wherein the step of creating the second image comprises the step of processing at least one of a raw image of the display surface, or a normalized image produced from the raw image, wherein the raw image is made at the second time index in response to light reflected from the one or more physical objects and received by a light sensor.

4. The method of claim 2, further comprising the step of:
   (a) determining whether at least some points in the first image intersect with points within the graphical object; and
   (b) only manipulating the graphical object by applying the optical flow to the graphical object if the optical flow is determined for the at least some points in the first image that intersect with points within the graphical object.

5. The method of claim 2, further comprising the steps of:
   (a) determining that only a single graphical object that can be manipulated is presented on the display surface; and
   (b) manipulating the graphical object image by applying the optical flow without regard to whether any points in the first image intersect with points within the graphical object.

6. The method of claim 1, wherein the optical flow vectors describing the two-dimensional motion of the at least some points are determined based on at least one of: a block-matching algorithm, a Lucas-Kanade algorithm, or Horn and Schunck.

7. The method of claim 1, wherein the manipulation of the graphical object comprises at least one of the steps of:
   (a) translating the graphical object to a different disposition on the display surface;
   (b) rotating the graphical object to a different orientation on the displays surface; or
   (c) scaling the graphical object to change at least one of its size or its shape.

8. The method of claim 1, wherein the optical flow is repetitively determined at successive times to continuously manipulate the graphical object while the at least one the physical object is being moved.

9. A memory medium on which are stored machine executable instructions for carrying out the steps of claim 1.

10. Apparatus for detecting, applying, and displaying manipulation of a graphical object in response to movement of a physical object, comprising:
   (a) a display surface adjacent to which the physical object can be positioned and moved and on which the graphical image is presented;
   (b) a light source that emits light for illuminating a physical object disposed adjacent to the display surface;
   (c) a light sensor disposed so as to sense light reflected back from the physical object, through the display surface;
   (d) a processor in communication with the light sensor; and
   (e) a memory in communication with the processor, the memory storing data and machine instructions that when executed by the processor cause a plurality of functions to be carried out, including:
      (i) using the light sensor, creating a first image of the display surface in which one or more patches are included that represent one or more portions of the physical object at a first time index, and wherein the one or more patches include a plurality of points that intersect points in the graphical object at the first time index;

(ii) using the light sensor, creating a second image of the display surface in which the one or more patches are included and which represent the one or more portions of the physical object at a second time index occurring after the first time index;

(iii) determining flow vectors describing two-dimensional, in x and y directions, motion for at least some points in the one or more patches at the first time index and the second time index, the optical flow vectors defining an optical flow for the one or more portions of the one or more physical objects wherein determining flow vectors describing a two-dimensional, in x and y directions, motion for at least some of the plurality of points that intersect points in the graphical object comprises determining a merit of a computed (dx, dy) at a patch, by comparing a match score corresponding to (dx, dy) =0 against a best score for any (dx, dy) and discarding the flow information at this patch if the best score is not significantly better than that corresponding to (dx, dy) =0 so as to avoid spurious flow vectors computed on regions of an image without adequate texture; and (iv) manipulating the graphical object by applying the optical flow to the graphical object presented on the display surface.

11. The apparatus of claim 10, wherein the machine language instructions further cause the processor to process at least one of a raw image of the display surface, or a normalized image produced from the raw image, wherein the raw image is made at the first time index in response to a light reflected from the one or more physical objects and received by the light sensor.

12. The apparatus of claim 10, wherein the machine language instructions further cause the processor to process at least one of a raw image of the display surface, or a normalized image produced from the raw image, wherein the raw image is made at the second time index in response to light reflected from the one or more physical objects and received by the light sensor.

13. The apparatus of claim 12, wherein the machine instructions further cause the processor to:
   (a) determine whether at least some points in the first image intersect with points within the graphical object; and
   (b) only manipulate the graphical object by applying the optical flow to the graphical object if the optical flow is determined for the at least some points in the first image that intersect with points within the graphical object.

14. The apparatus of claim 12, wherein the machine instructions further cause the processor to:
   (a) determine that only a single graphical object that can be manipulated is presented on the display surface; and
   (b) manipulate the graphical object image by applying the optical flow without regard to whether any points in the first image intersect with points within the graphical object.

15. The apparatus of claim 10, wherein the machine language instructions further cause the processor to manipulate the graphical object by at least one of:
   (a) translating the graphical object to a different disposition on the display surface;
   (b) rotating the graphical object to a different orientation on the displays surface; or
   (c) scaling the graphical object to change at least one of its size or its shape.

16. The apparatus of claim 10, wherein the optical flow describing a two-dimensional motion of at least a portion of the physical object is determined based on at least one of: a block-matching algorithm, a Lucas-Kanade algorithm, or Horn and Schunck.

* * * * *